Dec. 6, 1927. 1,651,847
F. STEBLER
FRUIT GRADER
Filed Oct. 6, 1924 5 Sheets-Sheet 1
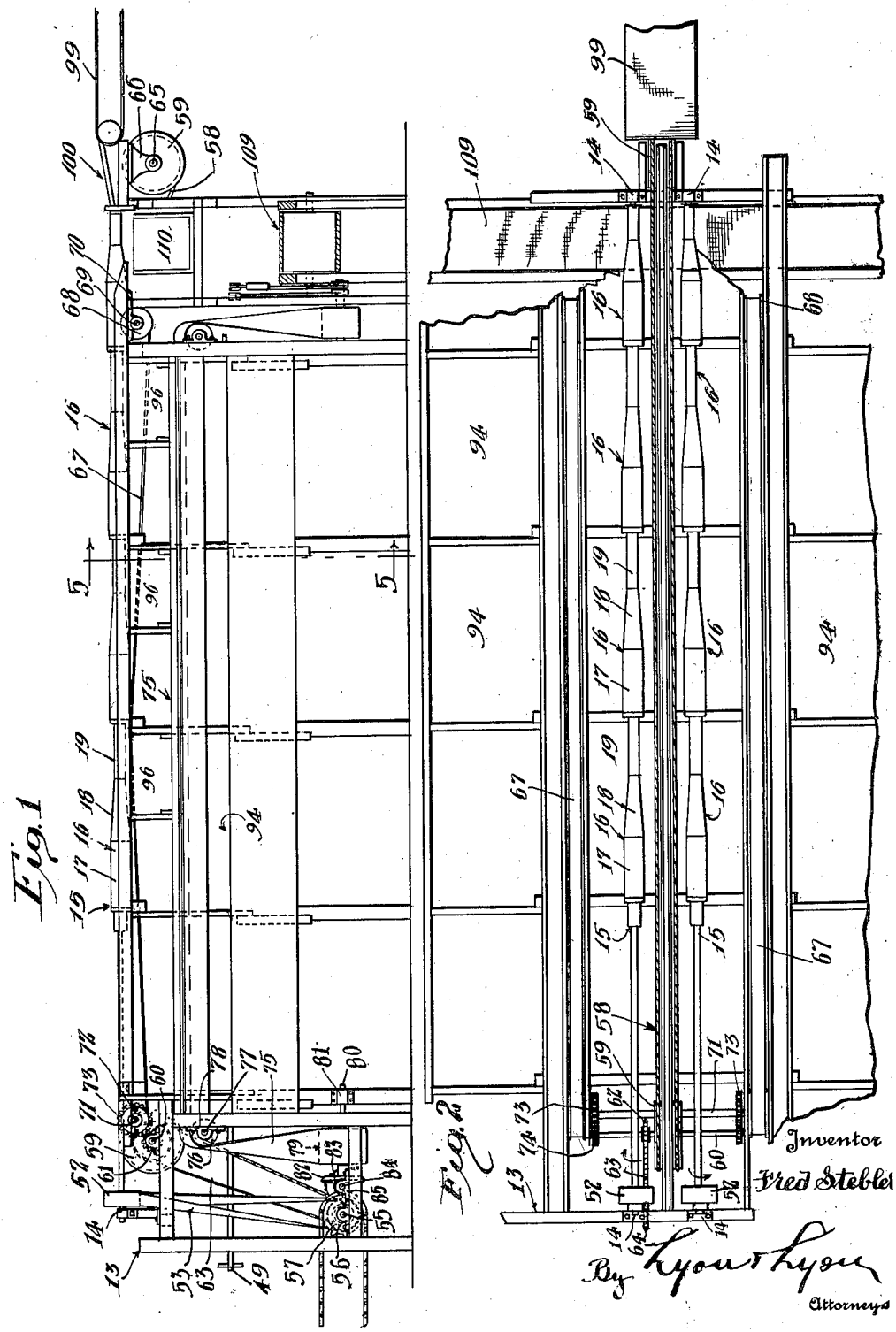

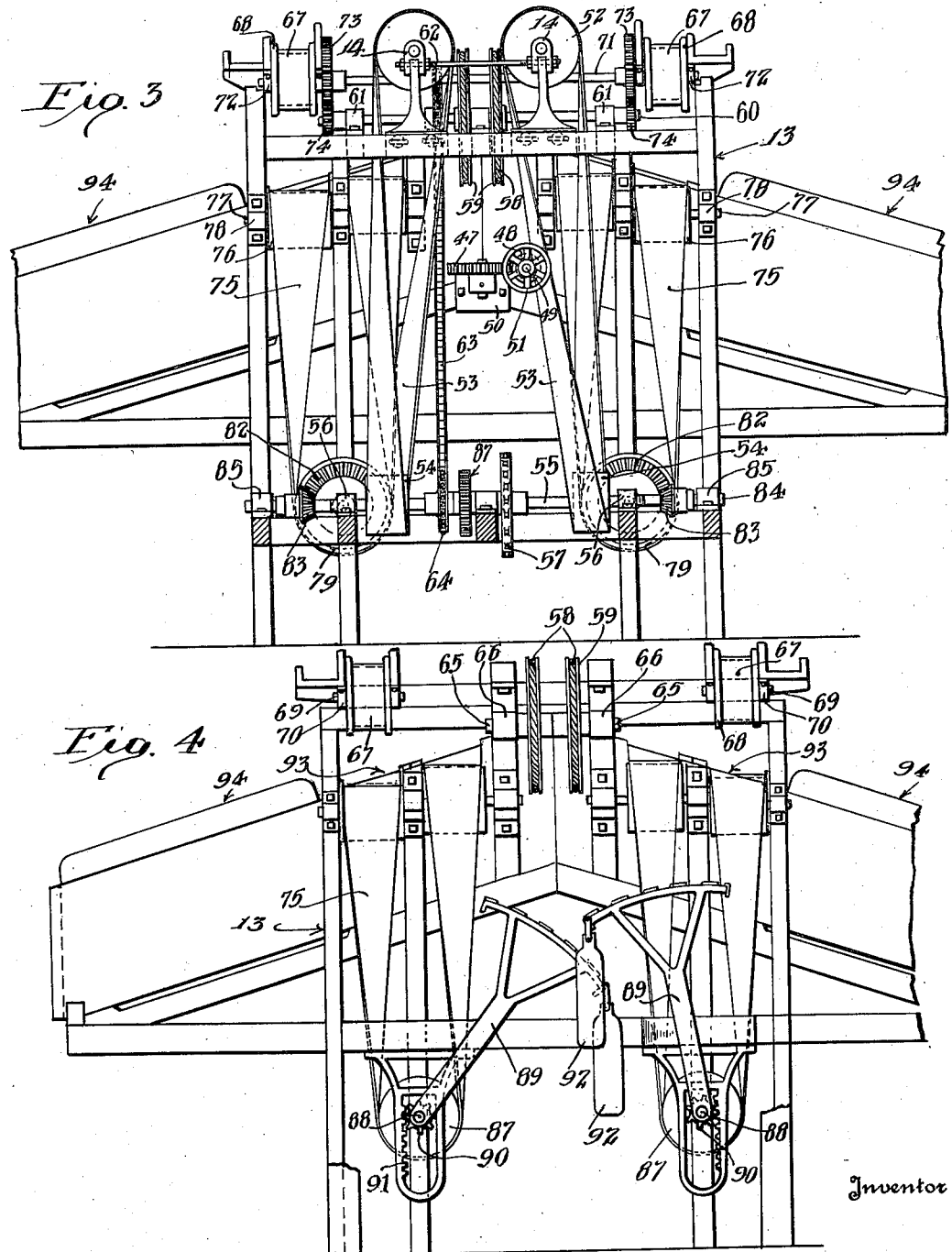

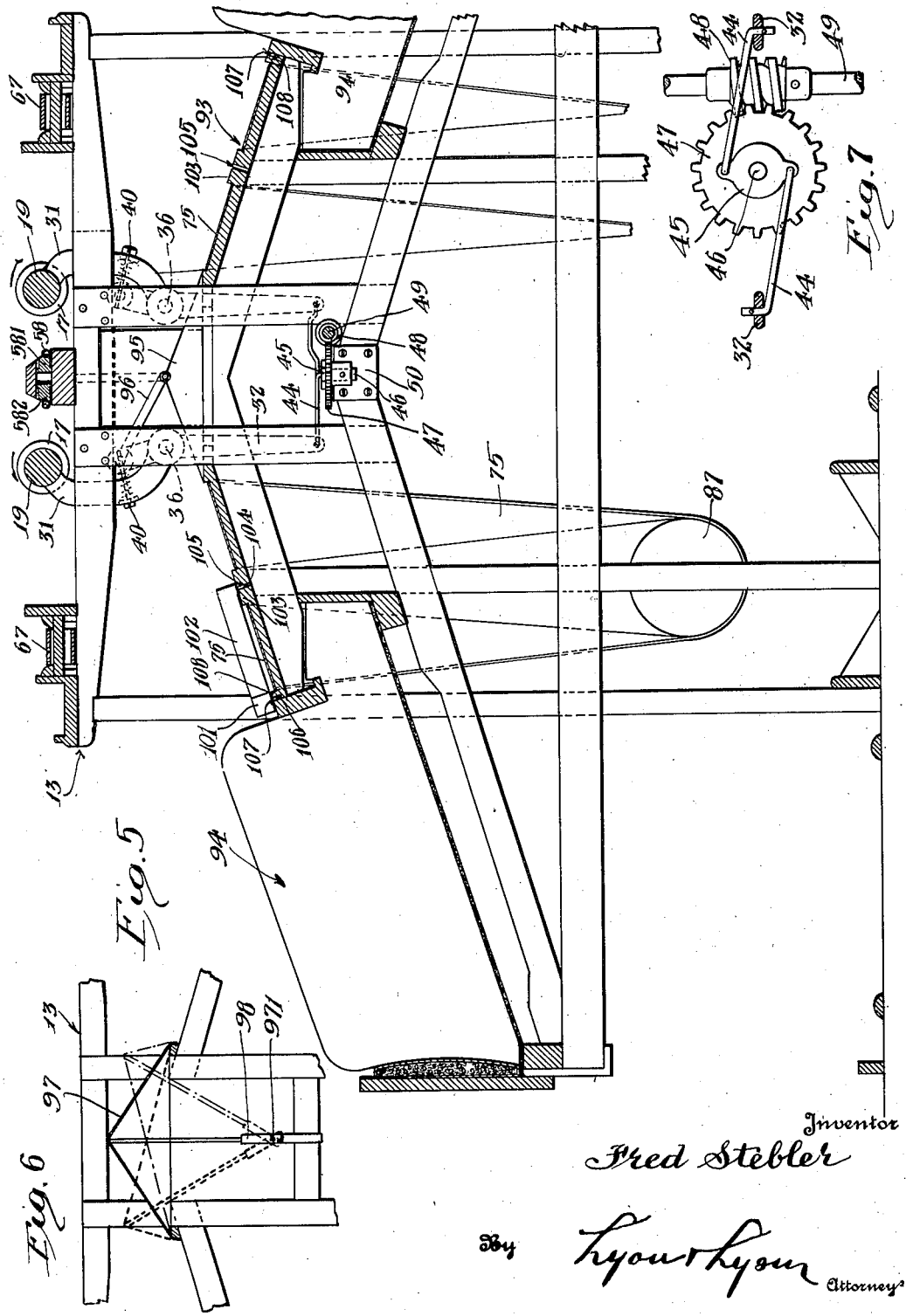

Dec. 6, 1927.  1,651,847
F. STEBLER
FRUIT GRADER
Filed Oct. 6, 1924   5 Sheets-Sheet 4
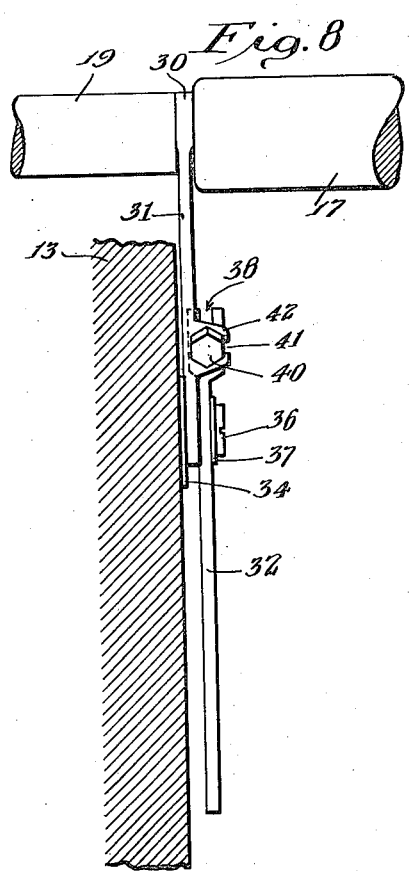
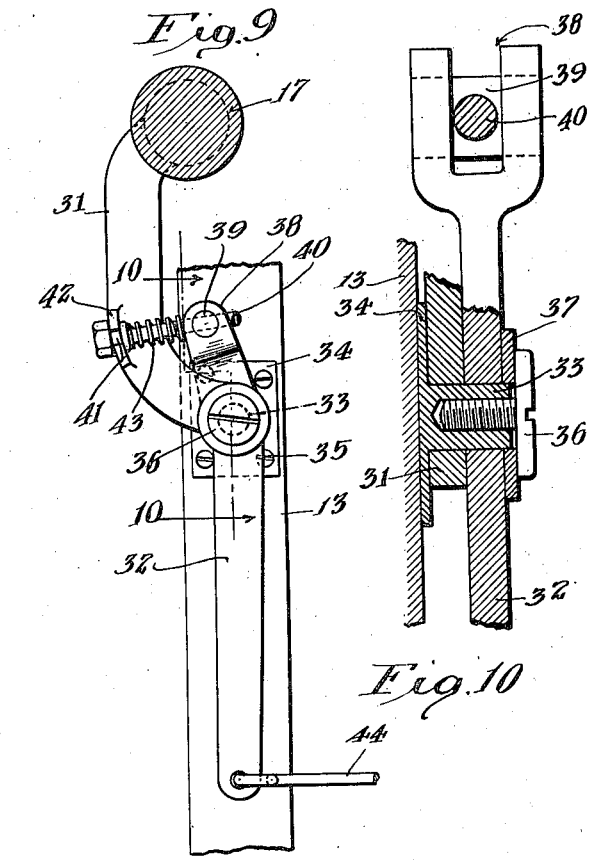
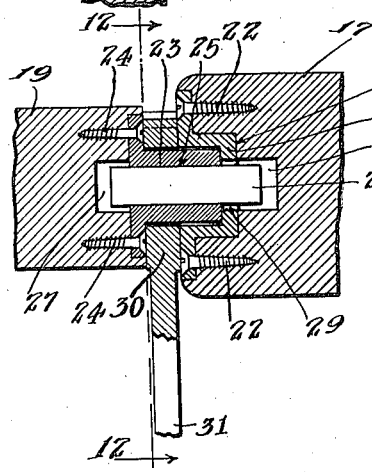
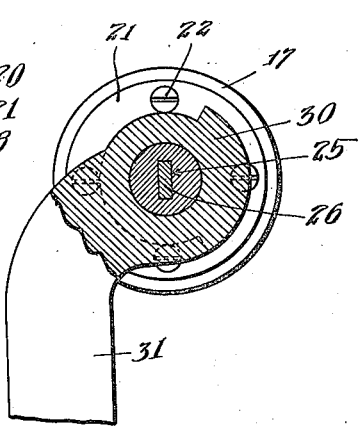
Inventor
Fred Stebler
By Lyon & Lyon
Attorneys

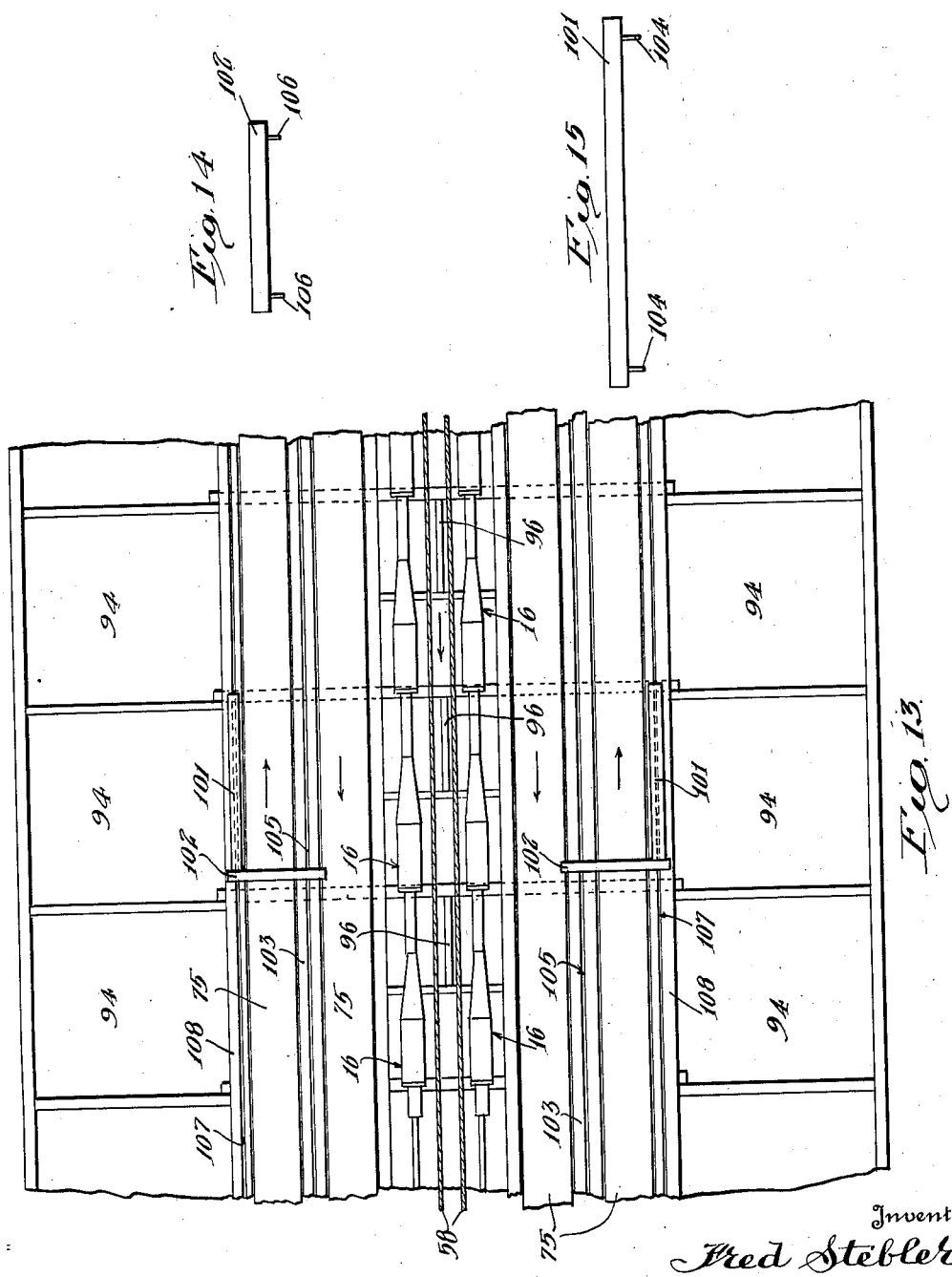

Patented Dec. 6, 1927.

1,651,847

UNITED STATES PATENT OFFICE.

FRED STEBLER, OF RIVERSIDE, CALIFORNIA, ASSIGNOR TO STEBLER-PARKER CO., OF RIVERSIDE, CALIFORNIA, A CORPORATION OF CALIFORNIA.

FRUIT GRADER.

Application filed October 6, 1924. Serial No. 741,879.

This invention relates to apparatus for grading fruit according to the size thereof.

An important object of the invention is to provide for independent and simultaneous adjustment of the rollers that, in conjunction with other means, effect grading of the fruit.

A further object is to provide a comparatively simple mechanism for effecting independent and simultaneous adjustments of the rollers.

Another object is to effect discharge of the fruit into any bin, whether the fruit pass the grading elements opposite to, forward or rearward of the bin into which it is desired to discharge it.

Another object is to provide a new form of deflector whereby the fruit is caused to discharge either into the bins at both sides of the apparatus or all of the fruit to discharge into the bin at one side or the other.

The accompanying drawings illustrate the invention:

Fig. 1 is a side elevation of a fruit grader constructed in accordance with the provisions of this invention, a fragment of a feed conveyor is shown and the transverse conveyor is shown in section.

Fig. 2 is a plan view of Fig. 1, a portion of the table and bins being broken away.

Fig. 3 is an enlarged rear end view from the left of Fig. 1.

Fig. 4 is an enlarged feed end elevation from the right of Fig. 1, omitting the transverse conveyor.

Fig. 5 is an enlarged fragmental sectional elevation mainly on the line indicated by 5—5, Fig. 1.

Fig. 6 is an end view of a modified form of adjustable deflector for the fruit.

Fig. 7 is an enlarged plan view of a portion of the mechanism for effecting simultaneous adjustment of the grading rollers, the levers being shown in section.

Fig. 8 is an edge view of one of the adjusting levers, fragments of two of the grading rollers also being shown.

Fig. 9 is an elevation of Fig. 8 from the right thereof.

Fig. 10 is a fragmental sectional elevation on the line indicated by 10—10 Fig. 9.

Fig. 11 is an enlarged sectional detail of one of the couplings between the rollers, a fragment of the associated adjusting lever and portions of two rollers also being shown.

Fig. 12 is a view, partly in section, from the line indicated by 12—12, Fig. 11.

Fig. 13 is a fragmental diagrammatic plan view of the fruit grader with fruit guides in position to discharge some of the fruit into a bin that is positioned forward of the roller that passes it.

Fig. 14 is a longitudinal view of one of the transverse guides detached; and

Fig. 15 is a longitudinal view of one of the longitudinal guides detached.

The frame of the fruit grader is indicated in general by the character 13 and is of any suitable construction. The frame supports at each end a pair of bearings 14 in which the ends of roller units 15 are journaled. In the instance shown there are two of such units, though it is to be understood that more may be provided if desired. Each of the roller units 15 comprises a suitable number of rollers 16 arranged in a longitudinally extending series and each roller has a larger straight portion 17 and a tapered portion 18, the portions 18 being reduced toward the feed end of the apparatus. Each roller 16 also comprises a reduced straight portion 19, the tapered portions 18 lying between the straight portions 17, 19.

The rollers 16 are loosely connected to one another and at such connections are rotatably supported, the construction at present preferred and shown in detail in Figs. 11 and 12 being as follows:

The rollers 16 are of wood or other suitable material and the larger straight portion 17 of each roller is provided in its end with a recess 20 to receive a metal coupling member 21 which is secured in place by screws 22 or other suitable fastening means. Loosely inserted in the coupling member 21 is a coupling member 23 which is secured by screws 24 or other suitable fastening means to the portion 19 of the adjacent roller. The member 23 is provided with an axially extending rectangular opening 25 through which projects a pin 26 rectangular in cross section. The pin 26 projects at one end into a recess 27 in the roller portion 19 and at its other end into a recess 28 in the portion 17 of the other roller, and the pin 26 extends through an opening 29 in the coupling member 21. The coupling member 23 is journaled in a bearing 30 formed in the upper end of a lever which comprises relatively adjustable sections 31, 32. The couplings just described loosely join the rollers to one another and there are as many levers 31, 32 as there are joints between the rollers. Thus the loosely jointed rollers constitute a flexible grading unit. Since the levers are all of the same construction, only one of them will be described in detail herein. The fulcrum for each of the levers 31, 32 is indicated at 33 and is in the form of a stud secured by a flange 34 and screws 35 to the frame 13. The lever sections 31, 32 are mounted side by side on the stud 33 and a screw 36 holds them on said stud, there preferably being a washer 37 between the lever section 32 and the head of the screw 36. The lever sections 31, 32 are adjustably connected to each other by any suitable means which, in this instance, is constructed as follows:

The upper end of the lever section 32 is forked as indicated at 38 and in the fork is mounted a trunnion nut 39 into which is threaded a screw 40 that extends through an eye 41 in a lug 42 projecting from one side of the lever section 31, the head of the screw 40 being held toward the lug 42 by a coil spring 43 which is interposed between the trunnion nut and the lug.

When the lever section 32 is held in fixed position, the ends of the rollers supported by the lever section 31 will be adjusted laterally by turning the screw 40. Thus are the rollers 16 independently adjusted toward and from the median line of the apparatus.

To either hold the lever sections 32 in fixed position or to effect simultaneous adjustment of the roller units toward and from each other, the following construction is at present relied upon. To the lower end of each of the lever sections 32 is connected a link 44 and the links 44 of oppositely arranged lever sections 32 pivotally engage a rotary member 45 mounted on a shaft 46. The shaft 46 is rotated by a worm gear 47 in mesh with a worm 48. Each pair of oppositely arranged lever sections 32 is operated through the associated links 44 and rotary member 45 by one of the worm gear wheels, and the worms 48 are all mounted on a single shaft 49 that extends longitudinally of the frame 13 and that is suitably journaled in bearings 50 mounted on the frame. The worm gear wheels are of different ratios to effect less movement of the rollers that pass the smaller fruit than those that pass the larger fruit. The shaft 49 may be turned, to simultaneously adjust all of the rollers, by a hand wheel 51 on one end of said shaft.

The roller units 15 are rotated by suitable means, the tops of said units rotating away from each other as indicated by the arrows thereon in Figs. 2 and 5. In this instance the rotating means comprises pulleys 52 fixed to one end of the roller units 15 and said pulleys are connected by belts 53 to other pulleys 54 mounted on a shaft 55 that extends transversely of the frame, said shaft being journaled on said frame by bearings 56. The shaft 55 is driven by any suitable means, in this instance by a sprocket wheel 57 which receives power from any suitable prime mover, not shown.

Running parallel to the roller units 15 and between said units are suitable means extending lengthwise of the rollers and spaced therefrom and adapted, in conjunction with the rollers, to support the fruit that is too large to pass between a given roller and said means which comprises endless fruit impellers or conveyors 58 that, in this instance, are in the form of ropes passing around rope sheaves 59. The sheaves 59 at one end of the frame are mounted on a shaft 60 journaled in bearings 61 on the frame 13 and the shaft 60 has a sprocket wheel 62 driven by a sprocket chain 63 which in turn receives motion from a sprocket wheel 64 mounted on the shaft 55. The sheaves 59 at the other end of the frame are idlers and are mounted on a shaft 65 journaled in bearings 66 that are mounted on the frame 13.

The ropes 58 are prevented from deflection in a direction away from the roller units by grooved strips 581 extending along the median line of the apparatus, the ropes engaging in the grooves 582 of said strips.

Running lengthwise of the frame near the sides thereof are endless conveyor belts 67, said belts running over pulleys 68. The pulleys 68 at one end of the frame are idlers and are mounted on shafts 69 journaled in bearings 70, and the pulleys 68 at the other end of the frame are fixed to a shaft 71 journaled in bearings 72 on the frame. The shaft 71 is driven by spur gears 73 in mesh with spur pinions 74 on the shaft 60.

Below the level of the belts 67 are other conveyor belts 75 which run over rollers 76 mounted on shafts 77 journaled in bearings 78 on the frame. The belts 75 are driven by pulleys 79 on shafts 80 journaled in bearings 81 on the frame. The shafts 80 are driven by beveled gears 82 in mesh with pinions 83 on a shaft 84 which is journaled in bearings 85 on the frame. The shaft 84 is driven from the shaft 56 through a gear train 86. At the other end of the frame the belts 75 engage idler pulleys 87 which are provided with suitable belt tightening devices constructed, in this instance, as follows:

The pulleys 87 are loose on shafts 88 to which are fixed weighted arms 89. Fixed on the shafts 88 are also pinions 90 which engage vertical racks 91 fixed to the frame 13, so that rotation of the arms 89 by their weights 92 will cause the pinions 90 to ride downwardly along the racks and thus keep the belts 75 stretched.

The belts 75 operate along the upper face of a distributing deck or table 93, the opposite sides of which slope downwardly and outwardly and discharge into bins 94. Each belt 75 travels in opposite directions on its side of the table. Suitable fruit guides 101, 102 may be detachably installed on the table 93 to deflect the fruit into whatever bin or bins it is desired that the fruit discharge into.

The guides 101 extend longitudinally of the table, being mounted on outer marginal flanges 108 of the table. The guides 101 may have ears 106 projecting from their bottom edges to engage in longitudinal grooves 107 in the flanges 108.

The guides 102 are placed transversely of the table at any desired point and the bottom edges thereof are provided with ears 104, one ear of each guide 102 engaging in the groove 107 and the other ear in a groove 105 in flanges 103 that separate the two passes of the belt from each other.

In Fig. 5 the middle portion of the table 93 is preferably formed of fabric 95, the opposite sides of which slope downwardly and outwardly and along the median line of the fabric 95 is pivotally mounted a deflecting member 96 which can be moved into vertical position so that the fruit dropped by the grading rollers on one side will enter the bins on that side and the fruit dropped by the grading units on the other side will be kept on that side; or the deflecting member may be swung to one side or the other so that all of the fruit will empty into the bins on one side only. In Fig. 5 the deflecting member 96 is shown in position to deflect all of the fruit to the bins on the right.

A modified form of the deflector is shown in Fig. 6, the fabric portion of the table being indicated at 97 and the deflecting member 98 being pivotally mounted at 971 beneath the fabric 97 so that as the deflecting member is swung from one side to the other it changes the angle of slope of the fabric, causing it to slope downwardly and outwardly to both side margins thereof from the median line, as indicated in solid lines, or to slope downwardly and outwardly from near either of the side margins to the opposite side margin, as indicated in broken lines.

The fruit is fed to the apparatus in any suitable manner and, in this instance, there is indicated in Figs. 1 and 2 a suitable conveyor 99 for this purpose, the fruit discharging from the conveyor 99 onto a surface 100 that slopes downwardly toward the feed end of the grader to approximately the level of the roller units.

At the feed end of the frame is a transversely extending belt conveyor 109 for carrying to any desired location boxes of fruit passed through the grader. A box is indicated at 110 in Fig. 1 supported by the frame in position to receive fruit discharging from the conveyors 67.

The invention operates as follows:

The adjustment of the rollers 16 will be such that portions of the different rollers will be spaced different distances from the conveyors 58. The spacing of the rollers 16 from the conveyors will gradually increase from the feed end of the grader toward the opposite end.

The fruit is impelled by the conveyor 99 to position between the nearest rollers 16 and the conveyors 58 and the fruit that is sufficiently small drops from between said rollers and conveyors onto the fabric 95 whence it rolls onto the upper runs of one or both belts 75 according to the position of the deflector 96. While the fruit is passing along the rollers 16, an attendant or attendants will cull imperfect fruit and will deposit the culls in either one of the conveyors 67 by which they are discharged into the box 110. The advantage of this will be apparent when it is considered that some of the bins will fill at a considerably faster rate than others and it may not be convenient to empty the bins immediately. Thus, one size of fruit may be directed into a bin until said bin is filled and then the same size may be directed into another bin in advance of the first mentioned bin without changing the adjustment of the rollers.

From the upper run of the belts 75 the fruit rolls onto the lower run of said belts, thence into the appropriate bin 94. If discharge of the fruit into the desired bin cannot be effected without the guides 101 or 102, such guides will be placed in proper position to obtain the desired result. For example, the guides may be positioned as in Fig. 13, so as to discharge some of the fruit into a bin that is positioned forward of the roller that passes it. For example, assuming that an orange drops from between the rope conveyor and one of the middle rollers of the six shown in Figure 13, said orange will drop onto the fabric 95 and roll onto the higher portion of one of the belts 75. This portion of the belt is traveling rearward in the direction of the arrow thereon and carries the orange rearward toward the guide 102 and said orange rolls off of said portion of the belt onto the lower portion of the belt which, it will be noted, is traveling forward in the direction of the arrow thereon. The orange when first discharged onto the lower portion of the belt has the rearward impetus imparted by the rearward moving higher portion of the belt but is stopped against further rearward motion by striking the guide 102. The lower portion of the belt now carries the orange forward but the orange cannot discharge into the bin nearest to the roller that has passed it because the orange will roll along the guide 101 and discharge into the next forward bin. The larger sizes of fruit will be carried by the conveyor ropes 58 to the left in Fig. 2 to position between the second pair of rollers and conveyor ropes 58 and, if the fruit is sufficiently small, it will drop on the fabric portion of the table and will enter the appropriate bin and, if too large, will pass to position between the next rollers and the rope conveyors and so on.

It will be seen that, if it be desired to effect a change in the size of the fruit being dropped at any of the rollers, the operator will adjust the screw 40 for that particular roller. If the screw is right hand threaded and is turned to the left, it will move the roller away from the rope conveyor 58, thus increasing the size of the fruit discharging by the roller. To decrease the size of the fruit the screw 40 will be turned to the right.

It will also be readily understood that, when it is desired to effect a change in the sizes of the fruit passing all of the rollers, said rollers will be simultaneously adjusted by turning the hand wheel 51, turning of said wheel clockwise causing the rollers to move away from the rope conveyors so as to increase the size of the fruit discharging past the rollers. The flexible construction of the roller units enables both the independent and simultaneous adjustment of the rollers to be made with great ease and such adjustments may be made while the machine is in operation, if that be desired.

I claim:

1. A fruit grader comprising a rope conveyor, means to drive the conveyor, a series of rollers loosely connected to one another, portions of the different rollers being spaced different distances from the conveyor, and means to independently and simultaneously adjust the different rollers toward and from the conveyor.

2. A fruit grader comprising a rope conveyor, means to drive the conveyor, a series of rollers, portions of the different rollers being spaced different distances from the conveyor, and means to independently and simultaneously adjust the different rollers toward and from the conveyor.

3. A fruit grader comprising rollers, couplings loosely connecting the rollers in a longitudinally extending series, levers having bearings supporting the couplings, fulcrums for the levers, means connected with the levers to hold each of the levers in different positions, and means extending lengthwise of the rollers and spaced therefrom and adapted in conjunction with the rollers to support fruit, portions of the different rollers being spaced different distances from said means.

4. A fruit grader comprising rollers, couplings loosely connecting the rollers in a longitudinally extending series, levers having bearings supporting the couplings, fulcrums for the levers, said levers formed in relatively movable sections and each lever having means to relatively adjust its sections, means connected with the levers to effect simultaneous adjustment of the levers to different positions, and means extending lengthwise of the rollers and spaced therefrom and adapted in conjunction with the rollers to support fruit, portions of the different rollers being spaced different distances from said means.

5. A fruit grader comprising a sloping table, means to move fruit along the table in opposite directions, a guide adjustably mounted on the table in position to engage the fruit moving in one direction to cause said fruit to shift to a position where said means will move the fruit in the opposite direction, and means along the lower portion of the table to receive the fruit as it discharges from the fruit moving means.

6. A fruit grader comprising bins, grading elements opposite to the bins operating to discharge fruit of different sizes to position opposite to the respective bins, and means to receive some of the fruit discharging from the grading elements and to move said fruit to position opposite a bin in advance of the grading elements from which said fruit discharges.

7. A fruit grader comprising a table having a fabric portion, means to drop fruit of different sizes on different areas of the fabric portion, and means operating against the fabric portion to slant said fabric portion on opposite sides of the median line thereof in opposite directions and to slant said fabric portion mainly in one direction or in the opposite direction.

8. A fruit grader comprising a table having a fabric portion sloping downwardly and outwardly in opposite directions from the median line thereof, means to drop fruit of different sizes on different areas of the fabric portion, and a deflector member adjustable above the fabric portion to vertical position along the median line thereof and to slanting position.

Signed at Los Angeles, California, this 27th day of September, 1924.

FRED STEBLER.